United States Patent Office 3,281,116
Patented Oct. 25, 1966

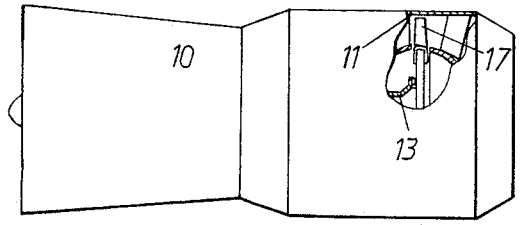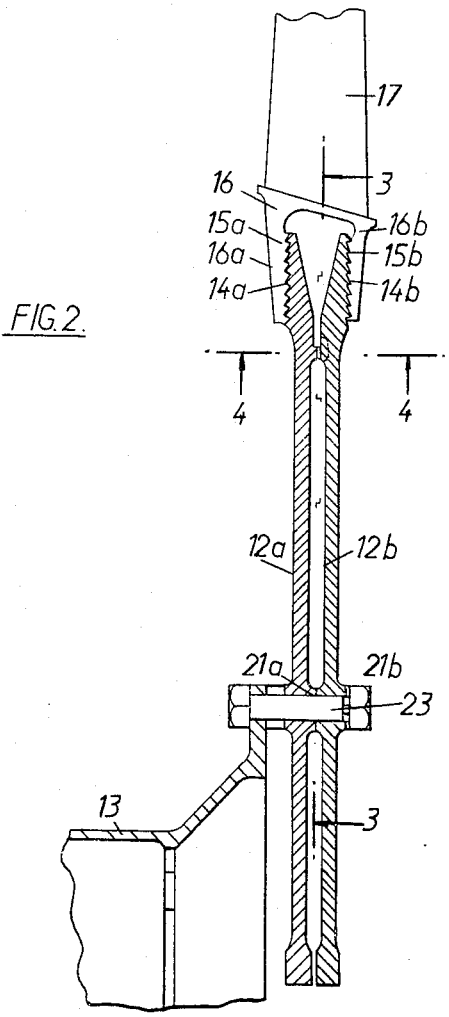

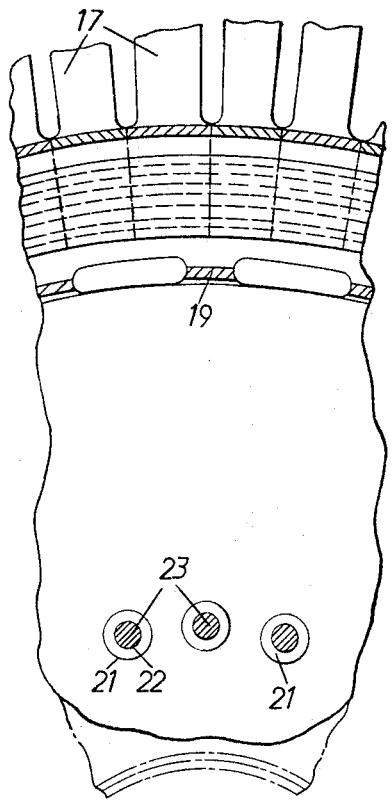
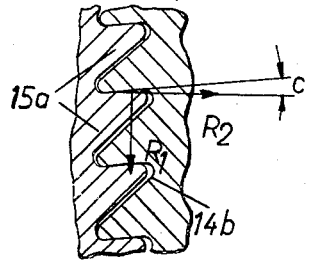
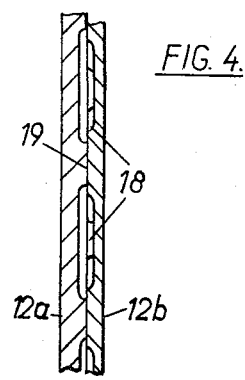

3,281,116
ROTOR AND BLADE ASSEMBLIES
John G. Keenan, Shelton Lock, Derby, England, assignor to Rolls-Royce Limited, Derby, England, a British company
Filed Feb. 2, 1966, Ser. No. 524,555
Claims priority, application Great Britain, Apr. 2, 1965, 13,978/65
7 Claims. (Cl. 253—77)

This invention relates to rotor and blade assemblies and has particular reference to such assemblies when used in gas turbine power plant.

According to the present invention there is provided a rotor and blade assembly comprising two co-axial discs which are capable of both relative rotation and of relative axial movement, each disc having a plurality of serrations adjacent the periphery of its outer face, a plurality of blades each blade having a forked root portion, the two prongs of the forked root portion each being provided with a plurality of corresponding serrations on the internal face thereof which are adapted to engage the serrations on the faces of the disc when the discs are moved axially apart.

The serrations on the disc faces may be in the form of projections or grooves and the serrations on the forked root portions of the blades would be corresponding grooves or projections.

Preferably the two discs are rotatable relative to each other and are relatively axially movable in order to facilitate assembly of the blade and rotor.

Preferably internal faces of the two discs are provided with means which are capable of producing an axial relative movement of the two discs when the said discs are rotated relatively to one another. Thus the means for producing the axial movement may be a plurality of bosses on one disc face and a plurality of corresponding recesses in the face of the other disc.

The invention also includes gas turbine power plant including the rotor and blade assembly according to the present invention.

A blade and rotor assembly according to the present invention provides for a lighter assembly relative to other known assemblies.

One embodiment of the invention as applied to a turbine assembly in a gas turbine engine will now be described in more detail, merely by way of example, with reference to the accompanying drawings wherein:

FIGURE 1 illustrates a gas turbine engine incorporating a blade and rotor assembly according to the present invention, FIGURE 2 is an enlarged sectional side view of the rotor and blade assembly as shown in FIGURE 1, FIGURE 3 is a section view on the line 3—3 of FIGURE 2, FIGURE 4 is a view on the line 4—4 of FIGURE 2, FIGURE 5 is an enlarged view of the mating projections and grooves of the blade and rotor of FIGURE 2.

Referring now to the drawings, FIGURE 1 shows a gas turbine engine, which may be a vertical lift engine, indicated generally by the reference numeral 10 having compressor means, combustion equipment and a single stage turbine means in flow series, the turbine means being indicated generally by reference numeral 11.

The rotor of the turbine means is shown in more detail in FIGURE 2 in which is shown a turbine rotor disc indicated generally by the reference numeral 12, comprising two halves 12a and 12b, mounted for rotation on the main shaft 13 of the engine 10. Adjacent the periphery of the upstream face of the disc half 12a and adjacent the periphery of the downstream face of the disc half 12b respectively are a plurality of grooves 14a and 14b. A turbine blade 17 is also shown in which the root portion consists of two prongs 16a and 16b on which teeth 15a and 15b are formed respectively.

The two prongs 16a and 16b are arranged to straddle the turbine disc 12 in assembly and the teeth 15a and 15b are provided on those faces of the prongs 16a and 16b which are adjacent the toothed faces of the disc halves 12a and 12b. In this way the teeth 15a and 15b on the prongs 16a and 16b are arranged for engagement with the grooves 14a and 14b when the blade and rotor are assembled.

The turbine disc half 12b is formed with a plurality of angularly spaced apart slots 18 adjacent the periphery but spaced radially inwardly from the grooves 14b. These slots 18 are arranged to be capable of receiving angularly spaced apart projections 19 on the disc half 12a.

Bosses 21a and 21b are arranged in angularly spaced apart relationship on both faces of the disc halves 12a and 12b and the bosses are drilled to provide holes 22 for receiving bolts 23. The bolts 23 secure the two disc halves 12a and 12b together. Three dowels, not shown, may be inserted in three of the holes 22 for accurately locating the two disc halves together.

In order to assemble a plurality of blades 17 on the disc 12 the two disc halves 12a and 12b are placed face to face to form the disc 12 with the grooves 14a and 14b on the outside faces. In this position the projections 19 lie within the slots 18 and the bosses 21a on the inside face of the disc half 12a lie in the spaces between the bosses 21b on the other disc half 12b. Thus the two disc halves may be pressed close enough together for the prongs 16a and 16b of the blade 17 to be placed over the periphery of the disc 12.

When the blades 17 are in position the two disc halves 12a and 12b are rotated relative to one another and the projections 19 will ride up out of the slots 18 into the position shown in FIGURE 4. At the same time the bosses 21a on the disc half 12a ride up from the spaces between the bosses 21b on the other disc half 12b until the bosses 21a and 21b overlie one another and the holes 22 in both bosses 21a and 21b are in alignment.

As a result of this the two disc halves 12a and 12b are forced axially apart, and the teeth 15a and 15b respectively engage the grooves 14a and 14b and the turbine blades are held firmly in place. The dowels are then inserted into three of the holes 22 to accurately hold the assembly together in the correct position. The turbine blades 17 may then be examined for correct radial alignment and if no adjustment is required the assembly is bolted together with a plurality of bolts 23.

FIGURE 5 shows an enlarged view of the teeth 15b and the grooves 14b and illustrates an angle $c$ between a horizontal line and the flank of the teeth 15b. Due to this small angle $c$, which is of the order of 5° the normal reaction between the teeth 15b and the sides of the grooves 14b is split into two components. One component $R_1$ is the centrifugal force due to rotation and the other component $R_2$ is at right angles to the said centrifugal force and thus tends to force the teeth 15b into engagement with the turbine disc half.

A similar angle $c$ is provided between the flanks of the teeth 15a and the horizontal to produce a similar force on teeth 15a to urge them into engagement with the grooves 14a.

Although the invention has been described with reference to a gas turbine engine it could equally well be applied to an industrial gas generator or like power plant having rotor and blade assemblies.

The single stage turbine rotor described may be replaced by a two or more stage turbine and the rotors of each stage may be constructed according to the present invention.

I claim:

1. A rotor and blade assembly comprising a shaft, two discs each having a plurality of serrations adjacent the periphery of the outer faces thereof, means mounting the discs co-axially on the shaft, a plurality of blades each having a forked root portion, a plurality of serrations on each internal face of the forked root portions of the blades, means disposed on the internal faces of the discs for producing relative axial movement of the discs when the discs are relatively rotated, the discs and blades being so arranged that when the discs are moved axially apart the serrations on the forked root portions of the blades engage the serrations on the faces of the disc.

2. A rotor and blade assembly according to claim 1 and in which the discs are provided with a plurality of grooves adjacent the periphery of the outer faces thereof and the forked root portions of the blades are provided with a plurality of corresponding projections on the inner faces thereof.

3. A rotor and blade assembly according to claim 1 and in which the discs are provided with a plurality of projections adjacent the periphery of the outer faces thereof and the forked root portions of the blades are provided with a plurality of corresponding grooves on the inner faces thereof.

4. A rotor and blade assembly according to claim 1 and in which a plurality of bosses are provided on the inner face of one disc and a plurality of recesses are provided on the inner face of the other disc, the bosses and recesses being so adapted and disposed as to cause relative axial movement of the discs when the discs are relatively rotated.

5. A rotor and blade assembly according to claim 1 and wherein means are provided for detachably securing the two discs together.

6. A rotor and blade assembly according to claim 1 and in which means are provided on the serrations for urging them axially into engagement when the rotor is rotated.

7. A gas turbine engine having a rotor and blade assembly as claimed in claim 1.

References Cited by the Examiner

FOREIGN PATENTS

| | | |
|---|---|---|
| 226,940 | 9/1958 | Australia. |
| 975,003 | 10/1950 | France. |
| 572,916 | 10/1945 | Great Britain. |

MARTIN P. SCHWADRON, *Primary Examiner.*

E. A. POWELL, JR., *Assistant Examiner.*